United States Patent Office 3,396,008
Patented Aug. 6, 1968

3,396,008
METHOD OF INCREASING BLOSSOM
GERMINATION
Verle W. Woods and Wellman D. Turney, Yakima, Wash., assignors to Woods Industries, Inc., Yakima, Wash., a corporation of Washington
No Drawing. Filed Mar. 16, 1964, Ser. No. 352,361
3 Claims. (Cl. 71—97)

ABSTRACT OF THE DISCLOSURE

A method of increasing blossom germination by adding to live pollen an amount of ground ferrous gluconate, utilizing artificial pollenization. In the production of the mixture, a carrier substance is used to provide workable volumes of the material. The ferrous gluconate is evidently utilized as food for the pollen after being deposited on the blossom and causes the pollen tubes to grow at a rate faster than normal.

---

This invention relates to an additive in a formulation for live pollen.

In the culture of some plants, particularly fruits that are not self-pollinating, it is often commercially advantageous to utilize artificial pollination programs. This type of program is carried out by gathering suitable pollen from the blossoms of selected plants or trees and then supplying the pollen to the blossoms desired to be fertilized. The application of pollen can be made by means of a brush or manual applicator or it can be supplied by the use of bees as a carrier, or can be dusted over an entire orchard or over a tree. The pollen can be applied dry or in a water mixture.

Various methods of treating pollen have been utilized and are being utilized today. Several substances have been found to be most useful in preserving the life of pollen. One such additive, disclosed in Patent No. 2,430,659 to Antles is *Lycopodium clavatum*. Other additives or carriers are mentioned in Patent No. 2,669,066 to Antles, including powdered casein, egg albumin and powdered milk. Other common materials used as fillers are powdered walnut shells or talc. The present invention is designed to enhance the fertility of such pollen and to increase its efficiency in effecting pollination of blossoms. The additive disclosed below is utilized in addition to the usual substances utilized in the industry to act as a carrier for the live pollen.

It is the object of this invention to provide an additive for live pollen which will increase both the percentage of germination of pollen and the subsequent fertilization of blossoms to which the pollen and additive are applied and which will also increase the rate of growth of the pollen on blossoms after application thereto.

Before proceeding with a description of the invention, it is well to recap the basic method of pollination, and particularly artificial pollenization. The pollen found in the anthers of a blossom is a dusty or sticky material produced during the growth of the blossom. It will consist of many fine pollen grains, each of which ultimately contains two male nuclei. The pollen is found naturally in a cavity in the blossom anther, commonly termed a "pollen sac." For purposes of artificial pollination, the anthers are gathered from blossoms in order that the pollen contained therein can be selectively applied to other blossoms desired to be fertilized.

After gathering of the pollen anthers, the pollen, commonly termed "anthered pollen," may be applied to other blossoms by manual application, spraying or dusting, or by bees to which the pollen has adhered. The pollen may be applied to the blossoms along with the anthers, or it might previously have been removed from the anthers by a screening process, the pollen normally then being mixed with a carrier substance to make up for the lost volume due to the removal of the anthers.

When applied to a blossom, the pollen adheres to the stigma, at the tip of the style, the filamentous prolongation of the apex of the ovary or swollen basal portion of the blossom carpel, which contains the female ovules. A blossom may have one or several carpels, which together form the gynaeceum of the flower. After alighting on the stigma, the pollen germinates, feeding on the material of the blossom. This germination involves the formation of a pollen tube, which is an outgrowth from the pollen grain that grows through the style to and into the embryo sac and conveys the male nuclei to the vicinity of the egg nucleus.

We have found that by adding to the pollen a chemical substance to enhance the rate of growth of the pollen tube and increase the percentage of germination of the pollen grains on the stigma, a substantial increase in blossom germination can be achieved in actual field use.

The additive which we have found to be most effective is ferrous gluconate $Fe(C_6H_{11}O_7)_2 \cdot 2H_2O$. This material is available in a technical grade classification (95%). The ferrous gluconate is normally in a granular form, and must first be ground to an impalpable powder by conventional grinding methods, utilizing a ball mill or similar apparatus. The material must be ground as fine as possible in order to be most effective, and this can be accomplished quite readily due to the fact that it is hard but not brittle.

The ferrous gluconate is intimately mixed with live pollen to achieve the results desired. We have developed a standard procedure for producing the additive formulation, which will be described below.

To produce a formulation of pollen anthers including this additive, the anthers containing the desired pollen are collected and between 10 to 1,000 mg. of the finely ground ferrous gluconate is added to a volume ounce of the prepared pollen anthers. A "volume ounce" as used in the pollen industry is $\frac{1}{16}$ pint (dry, U.S.) or 34.38 c.c. The exact amount of ferrous gluconate can be varied, depending upon the particular type of pollen being collected. For apples and other fruit trees, we have found that a mixture of 200 mg. to a volume ounce of prepared pollen anthers works quite satisfactorily.

If de-anthered pollen is desired, the desired ratio of ferrous gluconate within the above range is first applied to the pollen anthers, and the additive and pollen are then removed in the normal fashion by vibrating the anthers in a container designed to rub off the pollen, the anthers being screened from the pollen and additive. In such a process, an initial volume of a carrier substance such as *Lycopodium clavatum*, powdered walnut shells, or talc is first added to the pollen anthers along with the ferrous gluconate additive. After screening of the anthers, an additional volume of the carrier substance is added to the pollen in order to bring the pollen to its original volume on the anthers, the resulting mixture being known as a full-strength pollen. The pollen can be further diluted to half or quarter strength, or even less, by adding to its additional amounts of the carrier substance depending upon the type of application which is to be used in the field.

We have found on the average that the use of the additive as described above results in a 50 percent increase in the germination of blossoms. It has been found even more effective when used with pollen that is weak due to age or storage conditions. Exact figures cannot be supplied due to the many variations that exist in field use of such an item. However, it is generally accepted that average pollen has about a 50 percent germination rate under average weather conditions, whereas the average found in actual tests using the additive formulation described above is about 75 percent germination.

While the exact manner in which the additive works is not fully understood, it appears that the ferrous gluconate is actually utilized by the live pollen as food after being deposited on the sugar syrup at the blossom stigma. The ferrous gluconate is soluble in this substance. It permeates the substance and is digested by the pollen as food, causing the pollen tubes to grow at a faster rate than normal. The normal time for pollination is about 24 hours after application of the pollen. With the additive formulation described above, this period can be reduced, depending upon surrounding weather conditions.

Laboratory tests have been conducted using pollen in an agar solution on a series of plates, some plates using only live pollen and other plates having identical pollen with the ferrous gluconate additive as described above. Visual inspection of the plates following the pollen application showed a considerable increase in pollen germination and rate of pollen tube growth on the plates containing the additive. One such series of tests, checked two hours and forty-five minutes after pollen application, showed that the plates containing only live pollen had achieved 10 percent germination compared to 39 percent germination in the plates containing the pollen and additive. The same check showed that the average pollen tube length in the plates containing only live pollen was about 1.4 times the original diameter of the pollen grains, while the average length of the pollen tubes found in the plates to which had been added the pollen and additive was found to be 5.0 times the original diameter of the pollen grains. A second inspection of the same series of plates 24 hours after pollen application showed a 44 percent germination rate in the plates containing only live pollen and an 86 percent germination rate in the plates containing the pollen and additive. The pollen tube size in the plates containing only live pollen had increased to 5.8 times the original diameter of the pollen grains. The pollen on plates containing pollen and additive had then achieved an average pollen tube length 10.0 times the original diameter of the pollen grains.

Results determined to date show a substantial amount of improvement in germination and rate of germination of blossoms treated with the pollen formulation described above, including ferrous gluconate. The life of the pollen is extended beyond its usual life, and pollen that might otherwise be discarded can be revitalized for application in the normal fashion. The pollen can be applied in the usual fashion and no real change in normal orchard operations is required.

Having thus described our invention, we claim:

1. A method of increasing blossom germination consisting of applying a mixture of live pollen and finely ground ferrous gluconate to the blossom by artificial pollenization techniques, the percentage of ferrous gluconate in the mixture being such as to be effective in increasing the percentage of pollen germination and the rate of pollen tube growth and the quantity of the mixture applied to the blossoms being such as to be effective as a pollenizing agent.

2. The method defined in claim 1 wherein the ratio of ferrous gluconate to pollen is of the range between 10 to 1000 mg. of technical grade ferrous gluconate to a volume ounce of prepared pollen anthers.

3. The method defined in claim 1 wherein the ratio of ferrous gluconate to pollen is 200 mg. of technical grade ferrous gluconate to a volume ounce of prepared pollen anthers.

References Cited
UNITED STATES PATENTS

| | | | |
|---|---|---|---|
| 1,914,364 | 6/1933 | Eggert | 71—2.7 |
| 2,430,659 | 11/1947 | Antles | 47—58 |
| 2,669,066 | 2/1954 | Antles | 47—58 |

JAMES O. THOMAS, JR., *Primary Examiner.*